United States Patent
Chen

(10) Patent No.: US 7,726,288 B2
(45) Date of Patent: Jun. 1, 2010

(54) INTAKE REGULATING SYSTEM OF ENGINE

(75) Inventor: Pao-Lai Chen, No. 8, Lane 113, Sec. 2, Jhuangjing St., Pingtung City, Pingtung County 900 (TW)

(73) Assignee: Pao-Lai Chen, Pingtung County (TW)

( * ) Notice: Subject to any disclaimer, the term of this patent is extended or adjusted under 35 U.S.C. 154(b) by 348 days.

(21) Appl. No.: 11/729,685

(22) Filed: Mar. 29, 2007

(65) Prior Publication Data

US 2008/0168960 A1   Jul. 17, 2008

(30) Foreign Application Priority Data

Jan. 15, 2007   (TW) .............................. 96101502 A

(51) Int. Cl.
   *F02M 25/06* (2006.01)
(52) U.S. Cl. ...................................... 123/572; 123/574
(58) Field of Classification Search .......... 123/572–574
   See application file for complete search history.

(56) References Cited

U.S. PATENT DOCUMENTS

| 2,362,558 A | * | 11/1944 | Janzich | ........................ | 123/574 |
| 3,673,997 A | * | 7/1972 | Sawada | ....................... | 123/519 |
| 4,856,487 A | * | 8/1989 | Furuya | ....................... | 123/574 |

* cited by examiner

*Primary Examiner*—M. McMahon
(74) *Attorney, Agent, or Firm*—Morris Manning & Martin LLP; Tim Tingkang Xia

(57) ABSTRACT

An intake regulating system of an engine equips with an intake regulating-device connected with a breather hose for drawing the oil vapor and the leaked gases from the crankcase of the engine, thereby to mix with outside air to feed into the engine for re-combustion. The intake regulating-device comprises a housing and a pressure-sensing valve. The housing has an air inlet hole, an air outlet hole, and a slender hole. The air outlet hole and the slender hole both are in communication with the air inlet of engine via an intake manifold for generating a pressure difference thereby to drive the pressure-sensing valve. Preferably, the intake regulating-device provides a pair of regulating knobs for adapting the pressure-sensing valve with various intake volumes of an engine.

14 Claims, 8 Drawing Sheets

INTAKE REGULATING SYSTEM OF ENGINE

BACKGROUND OF THE INVENTION

1. Field of the Invention

The invention relates to an intake regulating system of engine, and more particularly, to an intake regulating system of engine that makes the engine's discharged gas pass through an air regulating valve and mix with the outside air, then reintroduce the mixed air back into the engine for re-combustion.

2. Description of the Prior Art

A crankcase forced ventilating system generally called PCV (Positive Crankcase Ventilation) is normally provided on the top of the cap of the rocker arm of an automobile engine. The PCV device is generally provided between the "ventilation hole" of the crankcase and the intake manifold.

When the engine is working, there are toxic gases that contain hydrocarbon (HC) and carbon monoxide (CO) etc. leaking from the combustion chamber to the crankcase, and discharging to the atmosphere causing air pollution. The purpose of providing the PCV device is to reintroduce the discharged and leaked gases back to the combustion chamber for re-combustion instead of discharging all of them into the atmosphere. The automobiles manufactured by all the countries are stipulated to equip with PCV device for compelling the toxic gases that is harmful to the health to be recycled, thereby, preventing hydrocarbon (HC) and carbon monoxide (CO) etc. from discharging into the atmosphere directly causing air pollution.

In general, the common limit for the ON/OFF action time of the intake valve, regardless of single or multiple intake valves of engine, of the conventional carburetor is only around $\frac{1}{100}$ second when the engine velocity reaches 3,000 rpm (revolution per minute) wherein the valve's ON time contains 30% while the valve's OFF time contains 60%. Therefore, it becomes an important issue for people skilled in the art to pursue how to supply effective and sufficient air in the instant of air intake of the intake valve.

FIG. 1 is a schematic diagram of an intake regulating system of engine of the prior art while FIG. 2 is a cross-sectional view of an air regulating valve of the intake regulating system of engine of the prior art. In the light of the above-mentioned problems and as shown in FIG. 1 and FIG. 2, there is an intake regulating-device of engine (1) on the market. The intake regulating-device of engine of the prior art is connected to the air tube of the engine to form an intake regulating system of the engine.

The intake regulating-device of engine includes a housing (11), a pair of springs (12) and (13), a valve piston (14), and a valve regulating knob (15). An inlet hole (110), an outlet hole (111), and a slender hole (112) connecting to the negative pressure are also furnished in the housing (11). The valve piston (14) is contained within the housing (11) and is capable of reciprocally sliding therein and forming a valve.

An end of the valve piston (14) is an air-tight slider (141) having a couple of compression rings (142) and (143) that make the air-tight slider (141) maintain air-tight while perform sliding with the interior surface of the housing (11). The other end of the valve piston (14) provides a conic surface (144) capable of air-tight contacting to the housing (11).

For the sake of maintaining air-tight contact between the conic surface (144) of the valve piston (14) and the housing (11) to intercept the air flow between the inlet hole (110) and the outlet hole (111), the resilient force of the spring (13) has to be greater than that of the spring (12).

As shown again in FIG. 1, when the engine (2) starts working, the intake valve has opened during the intake stroke, and the piston is moving downward, drawing air from an air cleaner (21) through an air pipe (210), a throttle (22), an intake manifold (23), and the air inlet (20). A mixture of air and gasoline vapor is then drawn into the cylinder. Conventional carburetor makes use of a Venturi tube to take in the combustion fuel automatically. However, the new fuel injection engine employs ECU (Electronic Control Unit) (220) to control the fuel nozzle making the fuel-air mixture maintain a constant fuel-air ratio in accordance with the detecting result of the AFM (Air Flow Meter) to draw the air-fuel mixture into the combustion chamber via the air inlet (20) for generating power.

For keeping the pressure balance between the crankcase (28) and the outside atmosphere, a hole connected to a breather hose (24) and the air pipe (210) for communicating with the outside air is provided above the liquid surface of oil in the crankcase 28 of the engine (2). What is more, part of the gas in the crankcase 28 can discharge through the breather hose (24) via the air pipe (210) and enter the intake manifold (23) together with the air drawing from the atmosphere. The other part of the gas passes through the PCV (Positive Crankcase Ventilation) device (25), intake manifold (23) and enters the air inlet (20) of the engine (2).

As shown in FIG. 1, the intake regulating-device of engine (1) of the prior art is communicating with the intake manifold (23) of the engine (2). As the car driver steps' on the accelerator for accelerating, the cylinder of the engine (2) will draw more air from the atmosphere causing the pressure drop at the outlet hole (111). Consequently, both ends of the air-tight slider (141) positioned on top of the valve piston (14) create pressure difference.

When the pressure difference is created and becomes larger than the unbalanced resilient force between the springs 12 and 13, the conic surface (144) of the valve piston (14) moves downward. The air path between the inlet hole (110) and the outlet hole (111) is varied according to the moving of the conic surface (144) of the valve piston (14).

As the conic surface (144) moves downward, the outside air can be drawn into the inlet hole (110), and therefore passing through the outlet hole (111), intake manifold (23) and air inlet (20) of engine, to provide sufficient and effective air for combustion. Preferably, the inlet hole (110) is connected with an air cleaner (1101) to prevent dirty air from getting in and for protecting the intake regulating-device of engine (1) and the engine (2).

In actual operation, it is found that the engine (2) of the prior art shown in FIG. 1 has the following demerits:

1. The oil vapor leaking from the combustion chamber of the engine to the crankcase 28 and entering directly from the breather hose (24) to the air pipe (210) and the intake manifold (23) may condense on the wall of the pipe if it comes across cold air causing greasy dirt deposit that is hard to clean up.

2. The intake regulating-device of engine (1) of the prior art is unable to effectively regulate the limiting position that is capable to open the valve piston (14) to adapt to the requirements of different specification for the engines.

SUMMARY OF THE INVENTION

To overcome the disadvantages of the prior art, the invention provides an intake regulating system of engine that makes use of an intake regulating device connecting to a breather hose for drawing in the discharged gas to mix with the outside air and reintroduce the mixed gas back to the engine for re-combustion.

The intake regulating-device of engine includes a pressure sensing valve, an inlet hole, an outlet hole, and a slender hole connected to a negative pressure. Among them, the outlet hole, and the slender hole connected to a negative pressure can communicate directly or indirectly with the air inlet. By making use of the variation of the air intake speed of the engine to generate pressure difference variation, the pressure sensing valve is capable of closing or varying its extent of opening.

Preferably, an adjusting knob can also be provided in the intake regulating-device for controlling the limit of the valve opening such that the intake regulating-device can adapt to intake regulation having various quantity of air intake of the engine.

The advantages and the range of suitability of the application of the invention will become apparent from the following description and its accompanying drawings of which:

DETAILED DESCRIPTION OF THE PREFERRED EMBODIMENT

Figure 1:
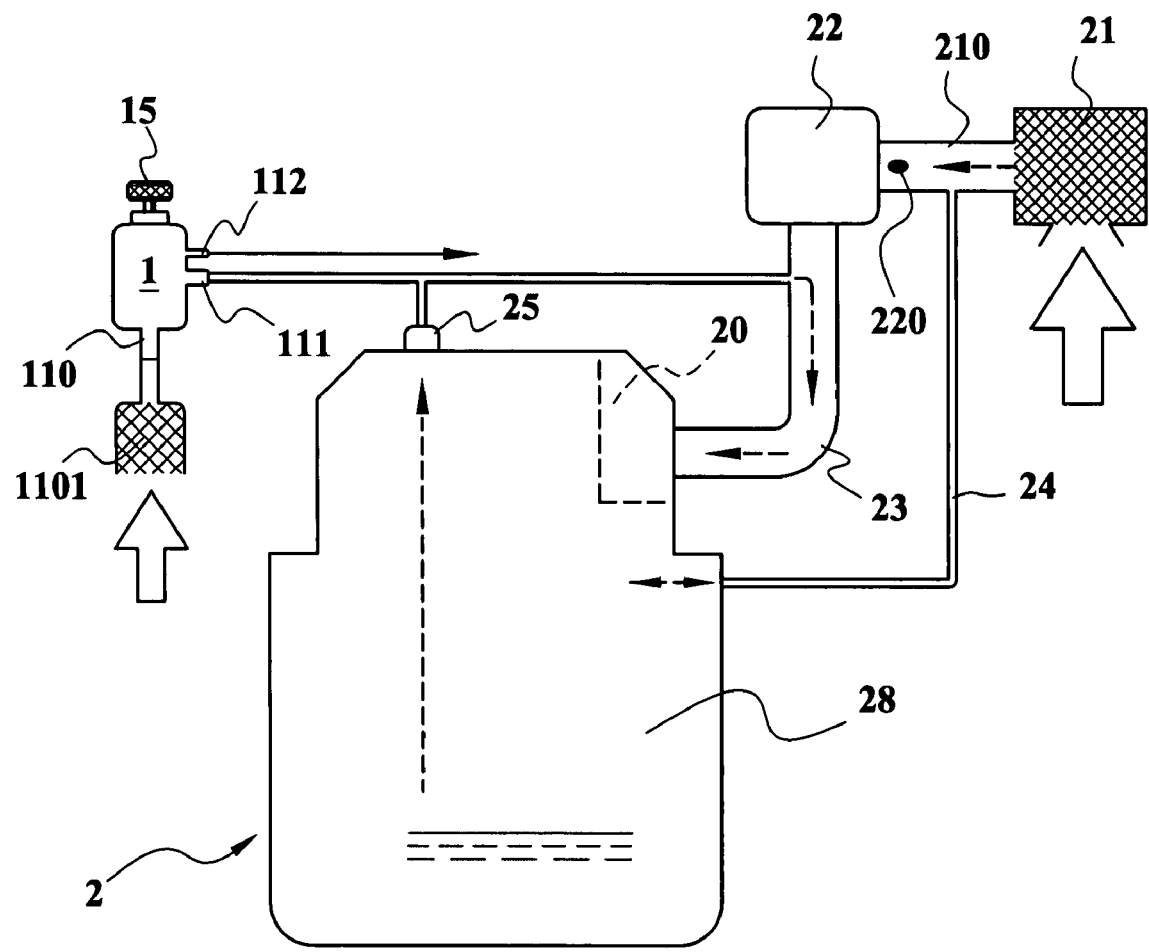
FIG. 1 is a schematic diagram of an intake regulating system of engine of the prior art.
Figure 2:
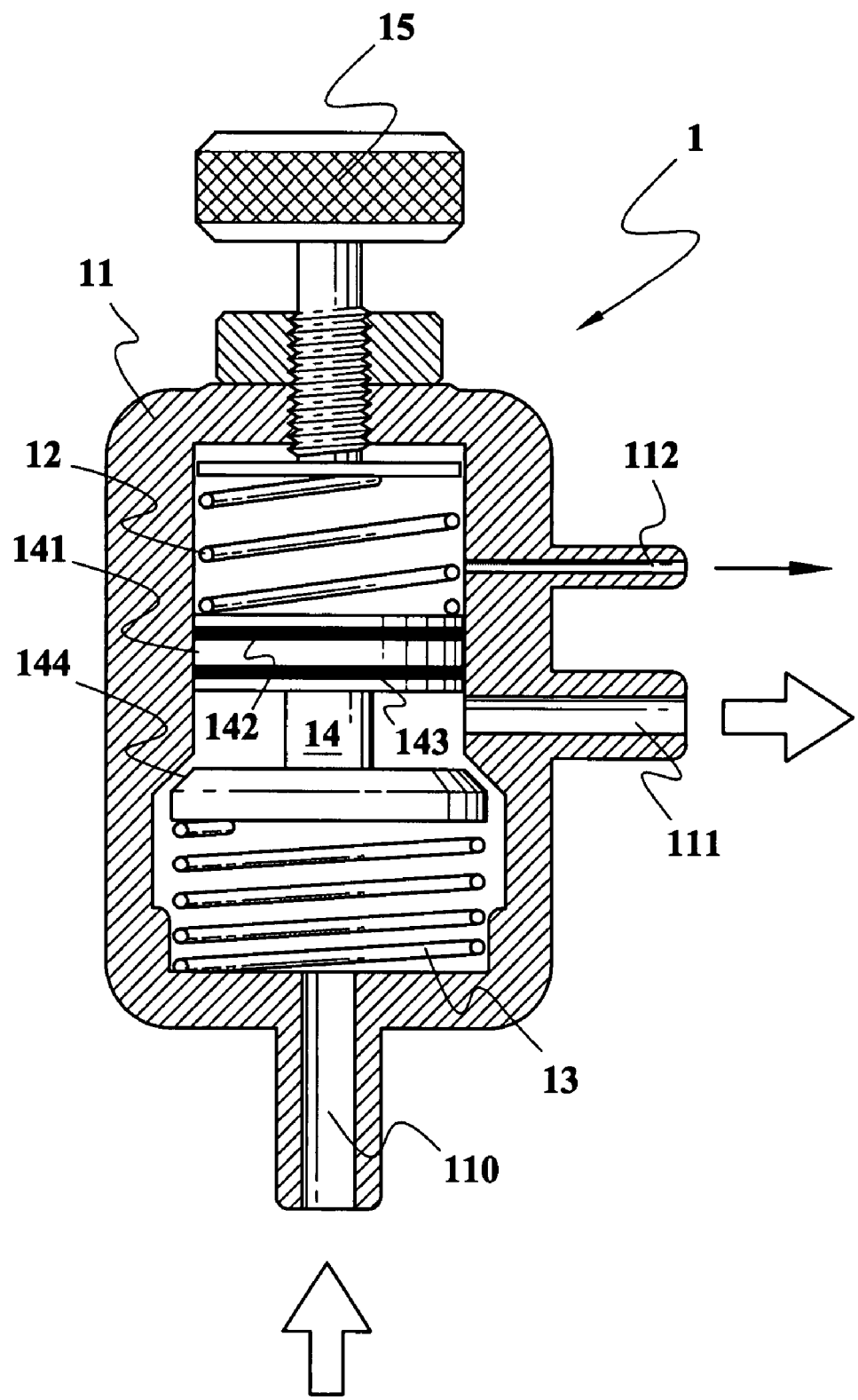
FIG. 2 is a cross-sectional view of an air regulating valve of the intake regulating system of engine of the prior art.
Figure 3:
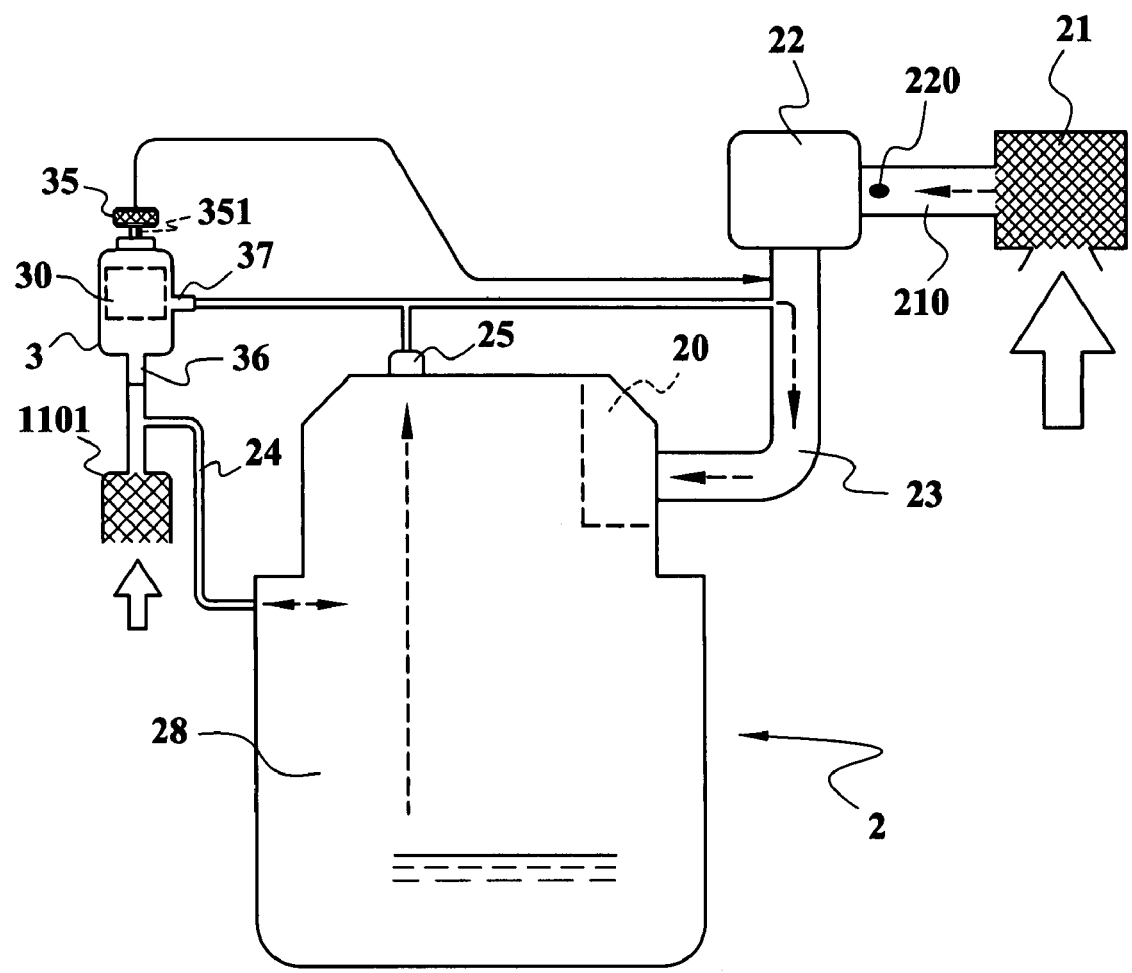
FIG. 3 is a schematic diagram of an intake regulating system of the engine of the first embodiment of the invention.

FIG. 3 is a schematic diagram of an intake regulating system of the engine of the first embodiment of the invention. As shown in FIG. 3, the system includes an intake regulating-device (3) that is connected to a breather hose (24) for conducting the discharging gas from the crankcase (28) to mix with the outside air via an air cleaner (1101). The air flow mixed with the discharging gas is fed into the engine (2) via the intake manifold (23) and air inlet (20) in intake strokes for re-combustion in ignition strokes.

Figure 7:
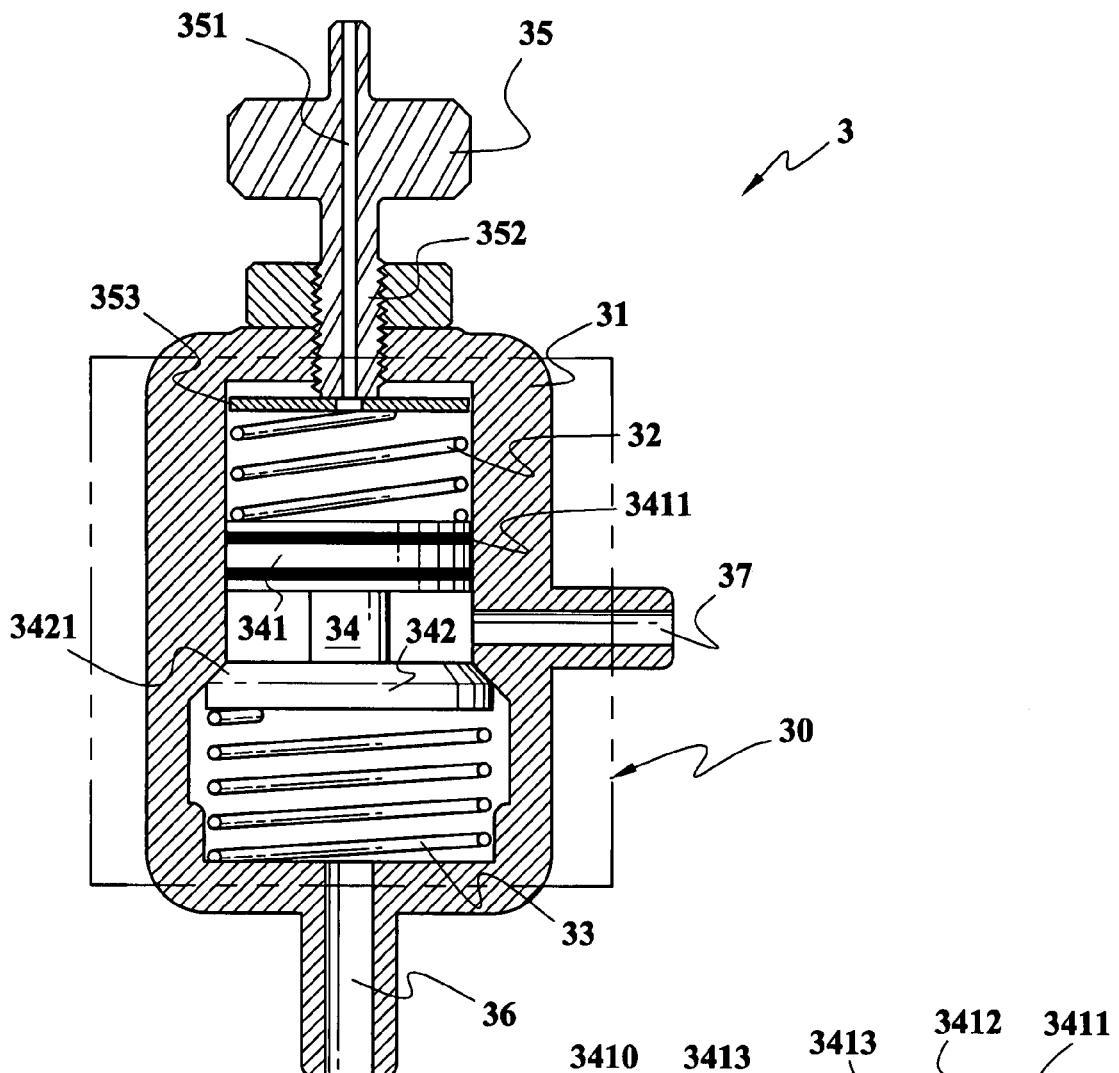
FIG. 7 is a cross-sectional view of the air regulating-valve of an intake regulating system of the engine of the fifth embodiment of the invention.
Figure 9:
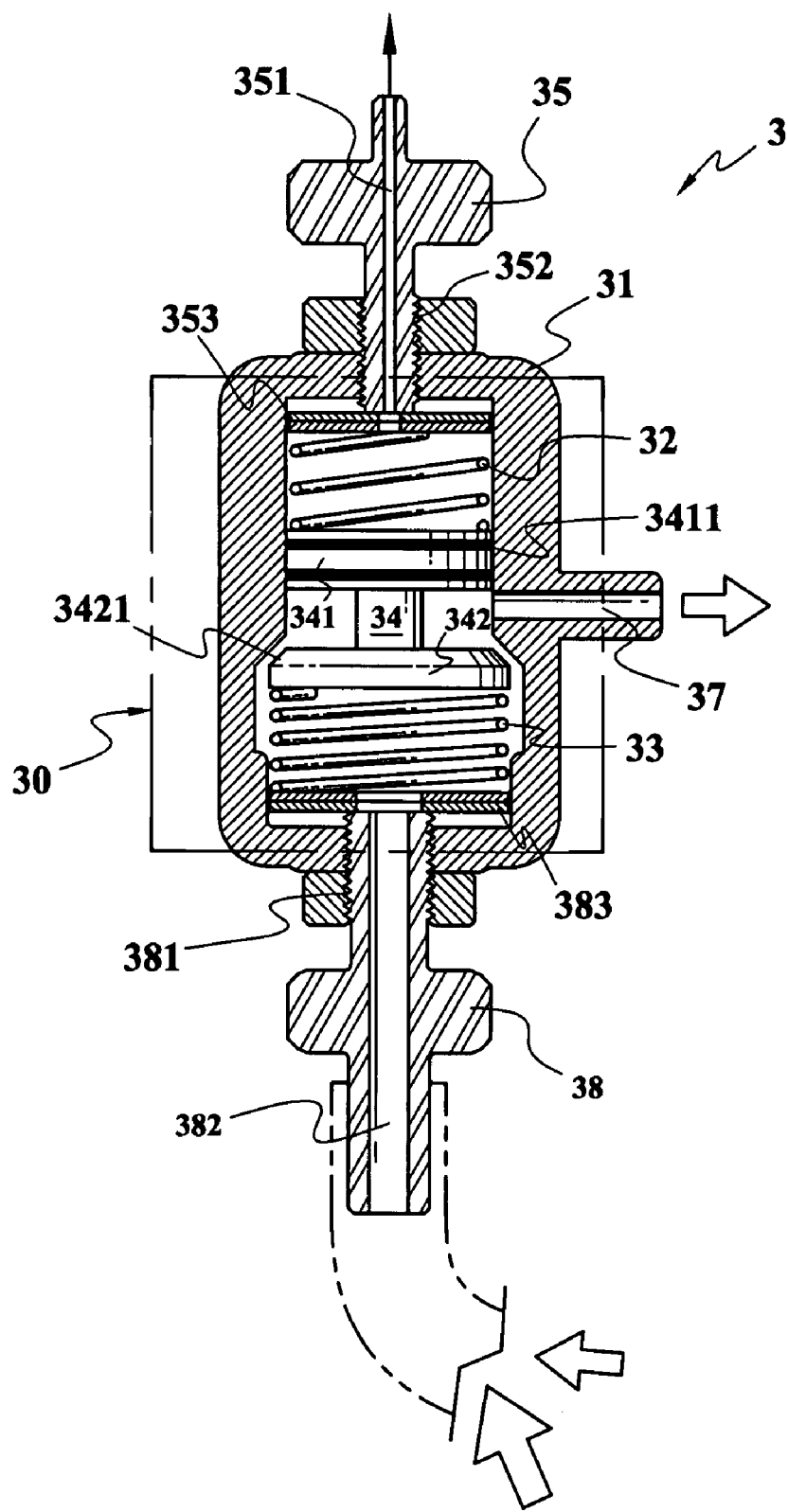
FIG. 9 is a cross-sectional view of the air regulating-valve of an intake regulating system of the engine of the seventh embodiment of the invention.

Referring to FIGS. 3, 7 and 9, the intake regulating-device (3) includes a housing (31) equipped with a valve action speed-regulating knob (35) and a pressure-sensing valve (30). The housing (31) provides a slender hole (351) connected to the air inlet (20) of the engine (2) via the center of the valve action speed-regulating knob (35) and the intake manifold (23). The housing (31) of the intake regulating-device (3) has another end providing an air inlet hole (36) and an air outlet hole (37).

In the present embodiment, the air outlet hole (37) communicates with the PCV device (25) by a three-way joint and communicates with the air inlet (20) via the intake manifold (23). According to this connection, in every intakes strokes of the engine (2), a pressure difference is formed for driving the pressure-sensing valve (30) to control the flow path between the air inlet hole (36) and an air outlet hole (37) from a fully closed to a sufficient opened state.

As the piston of the engine (2) moves downward, the outside air is drawn in to the engine (2) all the way through the air cleaner (21), air pipe (210), throttle (22), intake manifold (23), and the air inlet (20). Meanwhile, the electronic control unit (not shown) detects and controls the oil quantity from the fuel injection nozzle in accordance with the AFM 220 (air flow meter). In the meantime, the pressure-sensing valve (30) subjected to the attraction of the negative pressure in the intake manifold (23) is open making the outside air draw in through the air cleaner (1101).

The outside air drawn from the air inlet hole (36) through the air cleaner (1101) is mixed with the oil vapor and gasses from the breather hose (24), and passing through the air outlet hole (37). The mixed outside air, the oil vapor and gasses further mix with the gasses exhausted from the PCV device (25) before feed into the engine (2) through intake manifold (23) and air inlet (20) for re-combustion.

When the piston moves downward either in intake strokes or an ignition strokes of the engine (2), the oil vapor and the discharged gas is expelled to flow out of the crankcase (28) through the PCV device (25) and the breather hose (24), and are then drawn into the engine (2) for re-combustion through the above-mentioned paths. When the piston moves upward either in compression stroke and exhaust stroke, a negative pressure is formed in the space within the crankcase (28) below the piston, this causing the outside air to be draw in from the air cleaner (1101) and the breather hose (24) to fill the space and eliminate the negative pressure in no time. In this embodiment of the present invention, the waste gas and oil vapor discharged from the breather hose (24) both are not led to the air pipe (210), therefore the oil vapor is prevented from forming a condensed greasy dirt inside of the air pipe (210) and the inner walls of the intake manifold (23) as it does in the prior art, which is described above.

Figure 4:
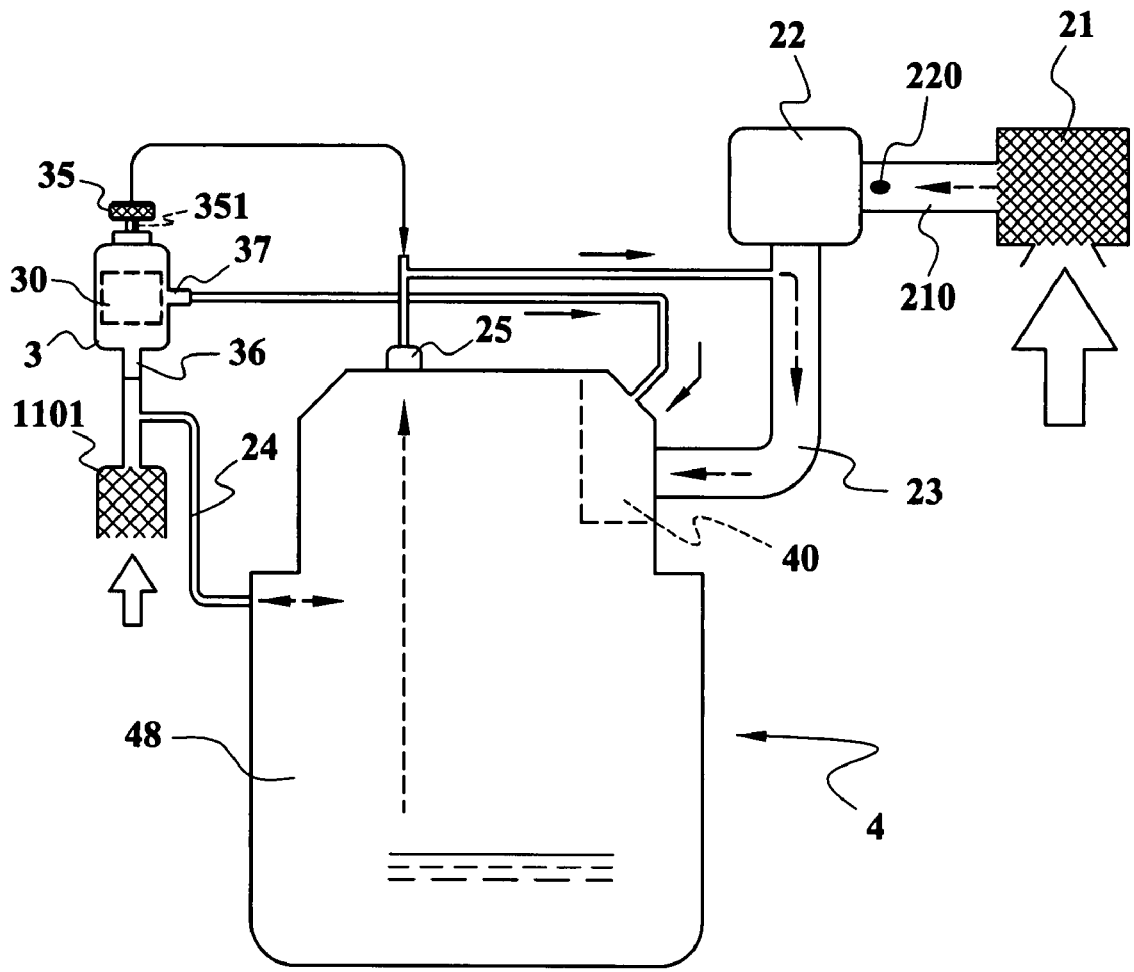
FIG. 4 is a schematic diagram of an intake regulating system of the engine of the second embodiment of the invention.

FIG. 4 is a schematic diagram of an intake regulating system of the engine of the second embodiment of the invention. As shown in FIG. 4, some automobile engines in European series have provided with a ventilating hole directed to the air inlet (40), thereby the air outlet hole (37) of the intake regulating-device (3) shown in FIG. 3 in the first embodiment of the invention can be employed to directly communicate with the air inlet (40).

Meanwhile, the slender hole (351) is communicated with the PCV device (25) and intake manifold (23) via a three-way joint and directs to the intake manifold (23) of engine (4). In this way, a pressure difference can be formed to drive the pressure-sensing valve (30) of the intake regulating-device (3) in every intake stroke of the engine (4). This allows the outside air to be drawn through the air cleaner (1101) and mixing with the waste gas and oil vapor discharged from crankcase (48) via the breather hose (24) to be feed into the engine (4) via the air outlet hole (37) and the air inlet (40) for re-combustion in every ignition stroke.

Figure 5:
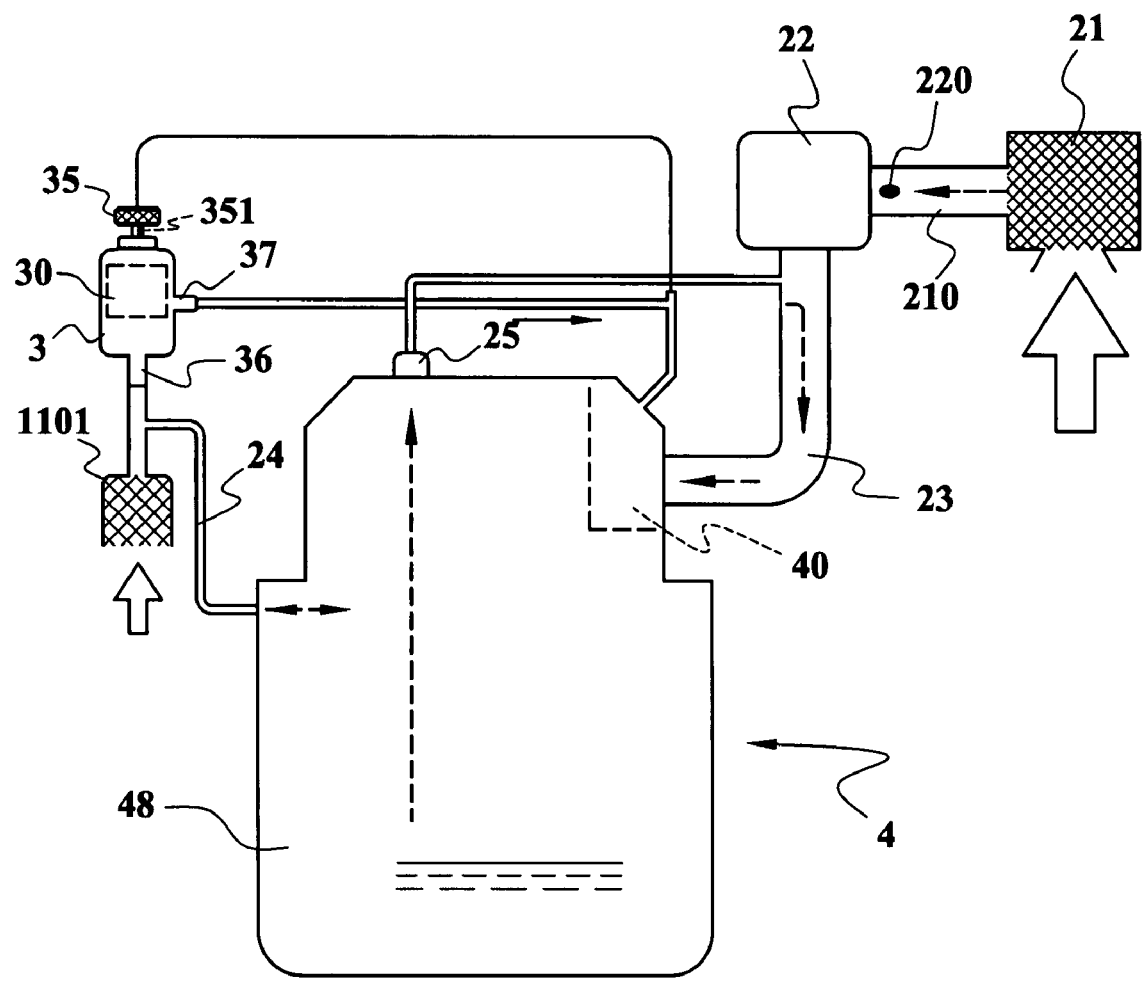
FIG. 5 is a schematic diagram of an intake regulating system of the engine of the third embodiment of the invention.

FIG. 5 is a schematic diagram of an intake regulating system of the engine of the third embodiment of the invention. As shown in FIG. 5, the slender hole (351) and the air outlet hole (37) of the intake regulating-device (3) are both connected by a three-way joint, so as to communicate with the air inlet (40) of engine (4). Meanwhile, the PCV device (25) is communicated to the air inlet (40) via the intake manifold (23).

As the air outlet hole (37) is larger than the slender hole (351), a pressure difference is formed instantly in every intake strokes of the engine 2 to drive the pressure-sensing valve (30) of the intake regulating-device (3). This allows the outside air to be drawn into the intake regulating-device (3) through the air cleaner (1101) and mixing with the waste gas and oil vapor discharged from crankcase (48) via the breather hose (24) and feeding into the engine (4) via the air outlet hole (37), three-way joint and the air inlet (40) of engine (4) for re-combustion.

Figure 6:
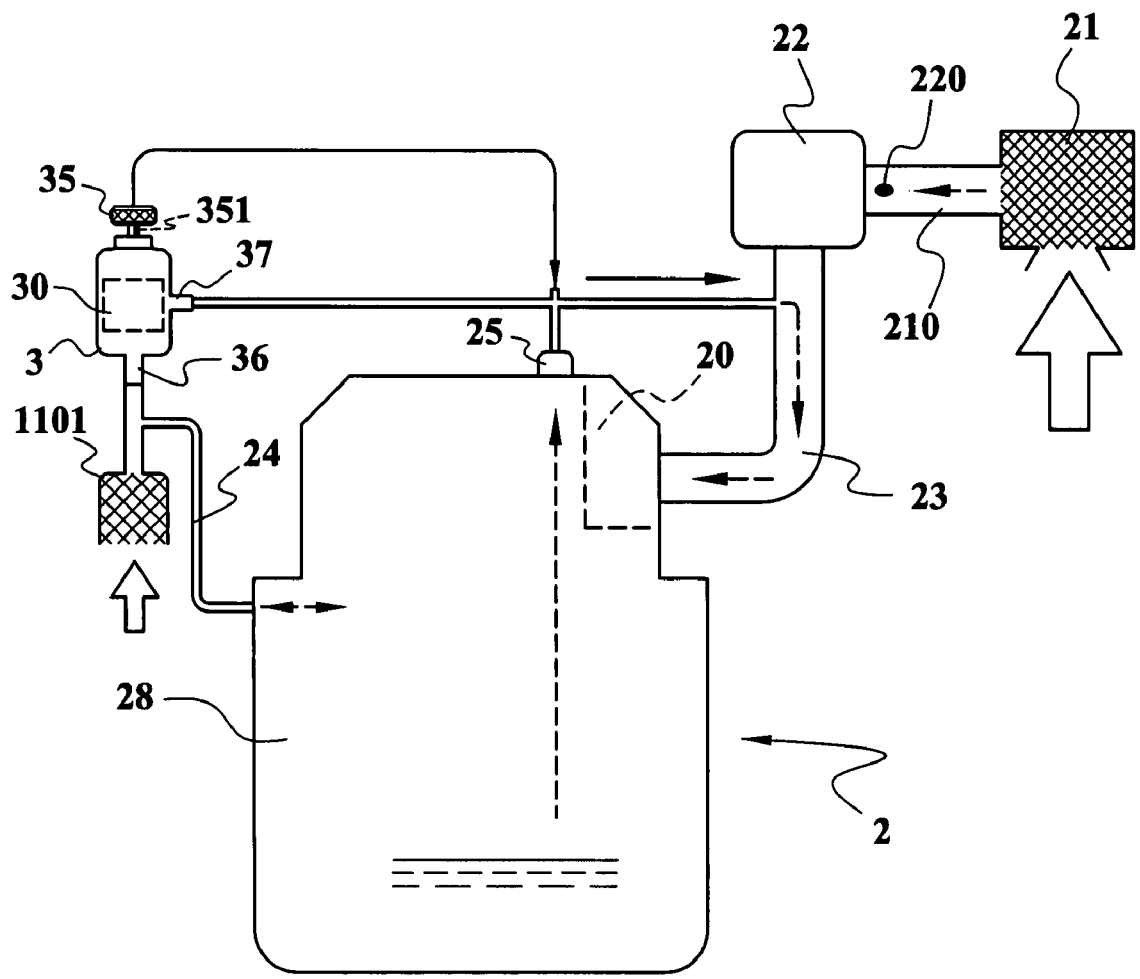
FIG. 6 is a schematic diagram of an intake regulating system of the engine of the fourth embodiment of the invention.

FIG. 6 is a schematic diagram of an intake regulating system of the engine of the fourth embodiment of the invention. As shown in FIG. 6, preferably the breather hose (24) of the engine (2) and the air cleaner (1101) can be connected to the air inlet hole (36) of the intake regulating-device (3) by a three-way joint. Further, the slender hole (351), the air outlet hole (37), and the PCV device (25) can be connected by a cross-joint and communicated with the air inlet (20) via the intake manifold (23).

As the air outlet hole (37) is larger than the slender hole (351), a pressure difference is formed instantly in every intake strokes of the engine 2 to drive the pressure-sensing valve (30) of the intake regulating-device (3). This allows the outside air to be drawn through the air cleaner (1101), and mixing with the waste gas and oil vapor discharged from crankcase 28 via the breather hose (24) before entering the intake regulating-device (3). The air flow mixed with the waste gas and oil vapor feed into the engine (4) via the air outlet hole (37), cross-joint, intake manifold (23) and the air inlet (20) of engine 2.

FIG. 7 is a cross-sectional view of the air regulating-valve of an intake regulating system of the engine of the above described embodiments of the invention. In addition to the intake regulating-device (3) of the fourth embodiment of the invention as mentioned above and shown in FIG. 6, the fifth embodiment of the invention as shown in FIG. 7 also includes a housing (31) for containing a pair of springs (32), (33), and a valve piston (34).

As shown in FIG. 7, an end of the housing (31) equips with a valve action speed-regulating knob (35) while the other end of the housing (31) provides an air inlet hole (36). Moreover, a side of the housing (31) provides an air outlet hole (37). The valve action speed-regulating knob (35) has a thread portion (352) for its threading into an end of the housing (31) and adjusting the retractable space for the spring (32). The compression action of the spring (32) pressed by the valve action speed-regulating knob (35) will increase the sliding speed of the valve piston (34), thereby, increase the reacting speed with respect to the pressure difference, and enhance the accelerated opening for the valve. In addition, a washer (353) can also be furnished at the lower end of the valve action speed-regulating knob (35) to make the exerting force of the spring (32) uniformly distributed.

A slender hole (351) connected to the negative pressure is furnished at the center of the valve action speed-regulating knob (35). Referring again to FIG. 3 through FIG. 6, the air outlet hole (37) and the slender hole (351) can be connected to the intake manifold (23) and the air inlet (20) respectively. The intake strokes of the engine (2) forms a pressure difference, the position of the valve piston (34) will vary to enable the portion (342), that is capable of air-tight fitting to the internal portion of the housing (e.g. the conic surface (3421) as shown in FIG. 7), move to vary the extent of opening of the pressure-sensing valve (30). Since the slender hole (351), which is connected to the negative pressure of the valve action speed-regulating knob (35), positions at the center of the housing, the action of the valve piston (34) will not be eccentric when it is subjected to the attraction of the engine's intake action.

Figure 8:
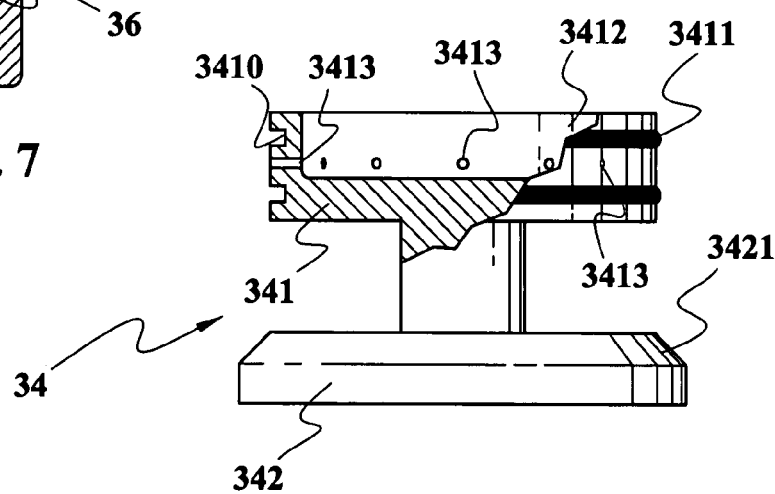
FIG. 8 is a partial cross-sectional view of the air regulating-valve of an intake regulating system of the engine of the sixth embodiment of the invention.

FIG. 8 is a cross-sectional view of the air regulating-valve of an intake regulating system of the engine of the sixth embodiment of the invention. As shown in FIG. 8, the valve piston (34) of the sixth embodiment of the invention is furnished in the housing (31) in the manner that the valve piston (34) is capable of reciprocally sliding within the housing (31). An end of the valve piston (34) equips with an air-tight slider (341) while the other end equips with a portion (342), that is capable of air-tight contacting within the housing (31), e.g. the conic surface (3421) as shown in FIG. 8.

The surface of the air-tight slider (341) of the valve piston (34) provides at least a circumferential groove (3410) for equipping at least an air-tight compression ring (3411). An oil pond (3412) and at least an oil hole (3413) communicated with the surface of the air-tight slider (341) for providing lubrication and maintaining air-tight sliding are furnished within the air-tight slider (341). Anti-freezing and/or high-temperature enduring lubrication oil is recommended to fill the oil pond (3412) to prevent the lubricating effect of the valve piston (34) from being affected by the extreme weather. The oil pond (3412), besides being used as the base for securing the spring (32), can be put in oil-absorbing cotton or other object for preventing the oil from being splashed over.

FIG. 9 is a cross-sectional view of the air regulating-valve of an intake regulating system of the engine of the seventh embodiment of the invention. As shown in FIG. 9, a valve opening regulating knob (38) of the seventh embodiment of the invention can be furnished to replace the air inlet hole (36) provided at an end of the housing (31) in the sixth embodiment as shown in FIG. 8. An end of the valve opening regulating knob (38) furnishes a thread portion (381). What is more, a air inlet hole (36) is furnished within the valve opening regulating knob (38) to replace the air inlet hole (36) shown in FIG. 5.

The valve opening regulating knob (38) is capable of varying the thread-in depth into the housing (31) for adjusting the retractable space for the spring (33) and for adjusting the maximum air flowing quantity for the air inlet hole (36) and air outlet hole (37) to adapt to the requirements of different specification for the engines. In addition, a washer (383) is provided to abut the lower end of the valve opening regulating knob (38) for indirectly adjusting the retractable space for the spring (33).

Referring again to FIG. 9, as the arrowheads shown, when the engine is accelerated, the cylinder of the engine will draw more air from the atmosphere causing the pressure drop at the intake manifold. Since the air outlet hole (37) of the housing (31) is relatively larger in diameter than that of the slender hole (351), which is connected to the negative pressure, of the valve action speed-regulating knob (35), a pressure difference can be formed at both ends of the air-tight slider (341).

The pressure difference combining with the resilient force of the spring (32) pushes the valve piston (34) to slide downward causing the portion 342, which is capable of air-tight contact within the housing (31), to open. The larger the quantity of air intake of the engine, the greater the extent of opening of the portion (342) that is capable of air-tight contact within the housing (31). In this way, it is capable of providing larger amount of air to be drawn by the engine making the fuel injected into the engine and the intake air maintain a "gasoline-to-air" ratio like 1:15 that is capable of approaching a "complete combustion".

By means of the air intake regulation of the system of the invention, the engine instantly draws in an appropriate amount of cold air from the atmosphere and the discharged gas from the crankcase to enter the combustion chamber for performing complete re-combustion, the system of the invention includes at least the following advantages:

1. The cold air lowers the temperature of the combustion chamber of the engine, thereby diminishes the amount of $NO_x$.

2. The cold air lowers the temperature of the combustion chamber of the engine, thereby improves the volumetric efficiency of the engine, consequently, increases the engine torque.

3. Having appropriate amount of outside air entering the combustion chamber instantly improves the phenomenon of incomplete combustion, thus reduces the discharge of toxic gases such as hydrocarbon (HC) and carbon monoxide (CO) etc. lowering the air pollution.

4. The fact that the outside air entering the combustion chamber without passing through the air flow meter (AFM) can diminish the quantity of gasoline injection.

5. Instead of having the discharged gases in the breather hose enter the intake manifold, the gases enter the intake manifold after the intake regulating-device of engine draws in the gases and mixes with the outside air, thereby the discharged oil vapor will not contaminate the air pipe; and since the air drawn in the air pipe does not go through the detection of the AFM, an over-injected fuel can be avoided.

It will become apparent to those people skilled in the art that various modifications and variations can be made to the mechanism of the invention without departing from the scope or spirit of the invention. In view of the foregoing description, it is intended that all the modifications and variation fall within the scope of the following appended claims and their equivalents.

What is claimed is:

1. An intake regulating system of engine having an intake regulating device conneced to an intake path of an engine, wherein the engine comprising a crankcase, a PCV (Positive Crankcase Ventilation) device, an intake manifold and an air inlet, and wherein the intake regulating-device comprising:

a housing, having an air inlet hole, an air outlet hole and a slender hole, the air inlet hole connected to an air cleaner and a breather hose which is communicated with the crankcase; both of the air outlet hole and the slender hole connected to the air inlet of engine via the intake manifold; and a pressure-sensing valve movably installed inside the housing for controlling the path between the air inlet hole and the air outlet hole of the housing according to the pressure difference between the air outlet hole and the slender hole, wherein the air outlet hole of the housing connects the PCV device and the intake manifold of the engine via a three-way joint and communicates with the air inlet of the engine via the intake manifold.

2. The intake regulating system of engine as claimed in claim 1, wherein the air inlet hole is connected to the air cleaner and the breather hose via a three-way joint.

3. The intake regulating system of engine as claimed in claim 1, wherein the slender hole connects to a negative pressure formed in the air inlet of the engine via the intake manifold.

4. The intake regulating system of engine as claimed in claim 1, wherein the air outlet hole of the housing communicates with the air inlet hole directly.

5. The intake regulating system of engine as claimed in claim 1, wherein the pressure-sensing valve comprises:

a valve piston having an air-tight slider slidably connected with the housing for performing an air-tight moving; and a pair of springs biased on both ends of the valve piston within the housing, each of the pair of springs having a retractable space.

6. The intake regulating system of engine as claimed in claim 5, wherein the air inlet hole is formed at an end of the housing and the air outlet hole is formed at a side of the housing.

7. The intake regulating system of engine as claimed in claim 5, wherein the valve piston having a conic surface for intercepting the air flow between the air inlet hole and the air outlet hole of the housing.

8. The intake regulating system of engine as claimed in claim 5, wherein the housing adjustably connects a valve action speed-regulating knob for adjusting the retractable space of one of the pair of springs.

9. The intake regulating system of engine as claimed in claim 5, wherein the air-tight slider of the valve piston has a circumferential groove for positing an air-tight compression ring.

10. The intake regulating system of engine as claimed in claim 8, wherein the slender hole is formed at center of the valve action speed-regulating knob.

11. The intake regulating system of engine as claimed in claim 9, wherein the housing has a washer connected between the valve action speed-regulating knob and one of the pair of spring; and the valve action speed-regulating knob is abutting on one side of the washer against one of the spring.

12. The intake regulating system of engine as claimed in claim 8, wherein the housing has a valve opening regulating knob at opposite end of the valve action speed-regulating knob, and use the valve opening regulating knob for adjusting the retractable space of the pair of springs.

13. The intake regulating system of engine as claimed in claim 12, wherein the air inlet hole of the housing is formed at the center of the valve opening regulating knob.

14. The intake regulating system of engine as claimed in claim 12, wherein the housing has a washer provided between the valve opening regulating knob and one of the pair of springs.

* * * * *